US008545915B2

(12) United States Patent  (10) Patent No.: US 8,545,915 B2
Schroeder                  (45) Date of Patent:     Oct. 1, 2013

(54) METHOD AND APPARATUS FOR VITAMIN D ENHANCEMENT IN MUSHROOMS

(75) Inventor: Gary M. Schroeder, Landenberg, PA (US)

(73) Assignee: Oakshire Holdings, Inc., Kennett Square, PA (US)

( * ) Notice: Subject to any disclaimer, the term of this patent is extended or adjusted under 35 U.S.C. 154(b) by 385 days.

(21) Appl. No.: 12/425,428

(22) Filed: Apr. 17, 2009

(65) Prior Publication Data

US 2009/0274806 A1   Nov. 5, 2009

(51) Int. Cl.
A23L 1/28   (2006.01)

(52) U.S. Cl.
USPC .......................................... 426/248; 426/410

(58) Field of Classification Search
USPC ............. 426/237–239, 72–73, 516, 240, 521, 426/248
See application file for complete search history.

(56) References Cited

U.S. PATENT DOCUMENTS

| | | |
|---|---|---|
| 4,892,821 A | 1/1990 | Omura et al. |
| 2003/0082072 A1 | 5/2003 | Koji et al. |
| 2004/0016887 A1 | 1/2004 | Fink et al. |
| 2004/0115791 A1 | 6/2004 | Sim et al. |
| 2005/0287255 A1* | 12/2005 | Notermans ................. 426/248 |
| 2006/0280753 A1 | 12/2006 | McNeary |
| 2008/0138469 A1 | 6/2008 | Degre et al. |
| 2009/0269441 A1 | 10/2009 | Beelman et al. |
| 2009/0304880 A1 | 12/2009 | Kidder et al. |
| 2010/0223843 A1 | 9/2010 | Williams |
| 2011/0091579 A1 | 4/2011 | Hausman |
| 2011/0159146 A1 | 6/2011 | Eklund-Jonsson et al. |
| 2012/0247007 A1 | 10/2012 | Verdellen et al. |

FOREIGN PATENT DOCUMENTS

| | | |
|---|---|---|
| CN | 101057658 A | 10/2007 |
| CN | 101904497 A | 12/2010 |
| CN | 101904498 A | 12/2010 |
| DE | 102005031362 A1 | 1/2007 |
| DE | 20 2010 016 402 U1 | 2/2011 |
| JP | 55015766 A | 2/1980 |
| JP | 57189660 A | 11/1982 |
| JP | 59021367 A * | 2/1984 |
| JP | 4183369 A | 6/1992 |
| JP | 5078201 A | 3/1993 |

(Continued)

OTHER PUBLICATIONS

Lee, J., et al., "The Effect of UV-B Irradiation and Hot-Air Drying on the Vitamin D2 Contents of Shiitake Mushroom (*Lentinus edodoes*)", Korean J. Soc. Food Cookery Sci., 18(2):173-178 (2002); 6 pages.*

(Continued)

*Primary Examiner* — Steven Leff
(74) *Attorney, Agent, or Firm* — Novak Druce Connolly Bove + Quigg LLP

(57) ABSTRACT

An apparatus and method for increasing Vitamin D content in mushrooms irradiates the mushroom(s) for a duration of up to six seconds with one or more pulses of light with wavelengths in the range of about 200 to about 1000 nanometers. The light is emitted by an electric glow discharge lamp, such as a xenon lamp, that emits ultra-violet light. The intensity of the light is such that after irradiation the mushrooms have a Vitamin D2 content of at least about 400 IU/84 g of mushrooms, which is 100% Daily Value of recommended Vitamin D for human consumption.

10 Claims, 4 Drawing Sheets

(56) References Cited

FOREIGN PATENT DOCUMENTS

| | | | |
|---|---|---|---|
| JP | 6062764 | A | 3/1994 |
| JP | 7194369 | A | 8/1995 |
| JP | 8051927 | A | 2/1996 |
| JP | 10229846 | A | 9/1998 |
| JP | 11000046 | A | 1/1999 |
| JP | 11056288 | A | 3/1999 |
| JP | 2000157045 | A | 6/2000 |
| JP | 2004222627 | A | 8/2004 |
| JP | 2006230327 | A | 9/2006 |
| JP | 2007236442 | A | 9/2007 |
| KR | 100322481 | B1 | 1/2002 |
| KR | 20030040258 | A | 5/2003 |
| KR | 20030083500 | A | 10/2003 |
| KR | 20030087209 | A | 11/2003 |
| KR | 20030087210 | A | 11/2003 |
| KR | 100637833 | B1 | 10/2006 |
| KR | 20080008790 | A | 1/2008 |
| KR | 20110043224 | A | 4/2011 |
| KR | 20110090180 | A | 8/2011 |

OTHER PUBLICATIONS

Microbial Spoilage of Fresh Mushroom: Chikthimmah et al.; 2006 p. 135-158; 19 total pages.*

English Translation KR 10-0637833; Hyeon et al.; Oct. 24, 2006, pp. 14.*

Feeney, M.J., *Mushrooms and Health Global Initiative Bulletin,* Nov. 2009, pp. 1-12.

Calvo, M.S., et al., *Vitamin D fortification in the United States and Canada: current status and data needs,* Am. J. Clin. Nutr., 2004 American Society for Clinical Nutrition, pp. 1710S-1716S.

Jasinghe, V.J., et al., *Distribution of ergosterol in different tissues of mushrooms and its effect on the conversion of ergosterol to vitamin $D_2$ by UV irradiation,* Food Chemistry 92, 2005, pp. 541-546.

*Pulsed UV . . . Technology,* 3 pages, Xenon Corporation.

*Xenon Flash Lamp,* 7 pages, retrieved from wikipedia.org.

Viraj J. Jasinghe, et al., Ultraviolet Irradiation: The Generator of Vitamin $D_2$ in Edible Mushrooms, 6 pages, www.elsevier.com/locate/foodchem.

Feeney, Mary Jo, Optimizing Vitamin D2 in Mushrooms, Report of a Pilot Sstudy to Expose Mushrooms to Ultraviolet Light, 6 pages, Mushroom News, May 2006.

Medallion Labs, Final Report dated Feb. 7, 2008, 1 pg.

Medallion Labs, Final Report dated Mar. 26, 2008, 2 pgs.

Medallion Labs, Final Report dated Apr. 18, 2008, 1 pg.

* cited by examiner

METHOD AND APPARATUS FOR VITAMIN D ENHANCEMENT IN MUSHROOMS

CROSS-REFERENCE TO RELATED APPLICATIONS

This application claims priority from U.S. provisional application Ser. No. 61/049,792 filed on May 2, 2008.

BACKGROUND OF THE INVENTION

1. Field of the Invention

This invention relates to a method and apparatus for increasing Vitamin D content in mushrooms by exposing the mushrooms to a broad spectrum of light for up to one second, using an electric glow discharge lamp.

2. Description of the Prior Art

The two major forms of Vitamin D are Vitamin D2 and D3. Vitamin D2 is not produced by the human body and is only derived from fingi and plant sources. Vitamin D3 is produced in human skin through exposure to sunlight. The benefits of Vitamin D are numerous and deficiency in the vitamin in humans can lead to several diseases. Because human exposure to sunlight for prolonged periods is impractical, in order to receive the benefits and overcome potential deficiencies in Vitamin D, there is a need for a method and an apparatus to increase Vitamin D2 in mushrooms.

Commercially grown mushrooms contain very low levels of Vitamin D2, typically less than 4-10%. Mushrooms, however, naturally contain ergosterol, a biological precursor to Vitamin D2. Research shows that ergosterol in several species of mushrooms converts to Vitamin D2 when exposed to UV light. White button mushrooms, brown portobello mushrooms, shiitake mushrooms, and oyster mushrooms are some types of mushrooms known to show a Vitamin D2 response when exposed to UV light. With sufficient duration and exposure, the level of Vitamin D2 in these and other mushroom species can exceed 400 IU/84 g of mushrooms, equating to 100% of the current recommended Daily Value for Vitamin D in the United States.

To increase Vitamin D level in mushrooms, certain methods in the background art require mushroom exposure to UV light for extended periods to achieve a significant increase in the level of Vitamin D. In one method, exposure times from 1 hour to 24 hours were required. In other methods, 20 minutes to 60 minutes of exposure time were required.

Commercial mushroom packaging equipment processes up to 180 individual packages of mushroom per minute or three individual packages per second. Thus, the long exposure times of the background art are impractical and are not feasible for commercial mushroom handling. Hence, there remains a need for a method to increase the Vitamin D content in mushrooms that is practical and feasible for use with commercial mushroom packaging equipment.

SUMMARY OF INVENTION

One embodiment of the present invention provides a method for increasing Vitamin D content in mushrooms by irradiating the mushroom(s) for a duration of up to six seconds, more preferably up to about two seconds, or up to about one second, with one or more pulses of light with wavelengths in the range of about 200 to about 1000 nanometers, preferably about 200 to about 800 nanometers. In this embodiment, the light is emitted by an electric glow discharge lamp, such as a xenon lamp. The intensity of the light is such that after irradiation the mushroom has a Vitamin D content of at least about 400 IU/84 g of mushroom, which is 100% Daily Value of recommended Vitamin D for human consumption.

Another embodiment of the present invention provides an apparatus for increasing Vitamin D content in mushrooms by irradiating the mushrooms for up to six seconds, more preferably up to about two seconds, or up to about one second, with one or more pulses of light with wavelengths in the range of about 200 to about 1000 nanometers, preferably about 200 to about 800 nanometers, emitted by an electric glow discharge lamp, such as a xenon lamp, so that after irradiation the Vitamin D2 content in the mushrooms is at least 400 IU/84 g of mushrooms. The apparatus includes a light chamber for holding the lamp, a conveyor for conveying the mushrooms through the light chamber and means for controlling the temperature within the light chamber, such as a blower and exhaust.

DETAILED DESCRIPTION OF THE PREFERRED EMBODIMENTS

Figure 1:
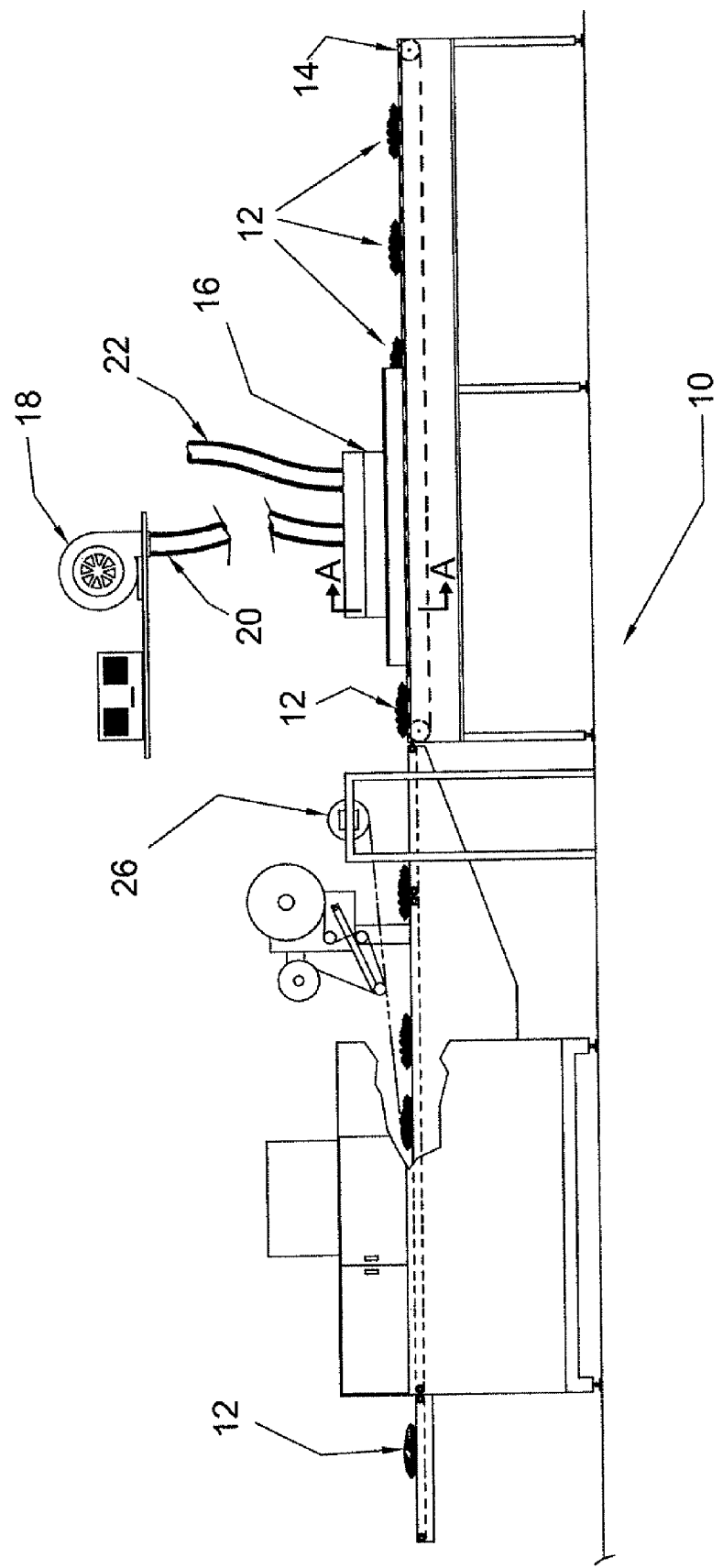
FIG. 1 is a schematic front elevational view of the apparatus.
Figure 2:
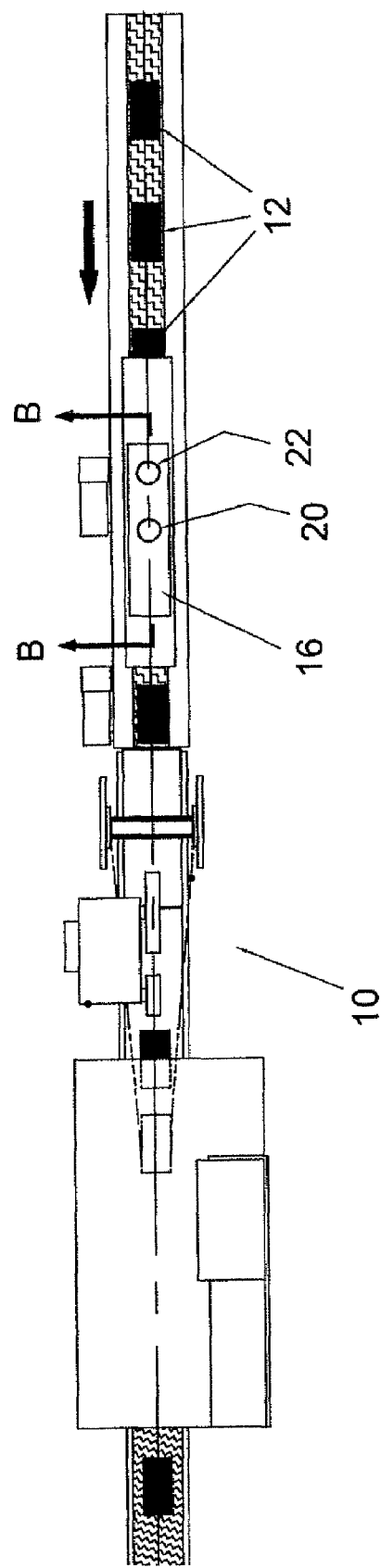
FIG. 2 is a schematic top plan view of the apparatus.

Referring first to FIG. 1, an apparatus 10 for increasing Vitamin D content in mushrooms is shown schematically. Mushroom trays or packages 12 are placed on a conveyor 14 that moves at a rate of about one-half package to about three packages per second. The mushroom packages 12 are moved into a light chamber 16. After the mushroom packages 12 come through the light chamber 16, the mushroom packages 12 are moved to a wrapping station 26 to be wrapped with thermoplastic film.

To control temperature within the light chamber 16, air is blown into the light chamber 16 using a blower 18. Connected to the blower 18 is an intake hose 20 used to force air into the light chamber 16. The forced air is then removed from the light chamber 16 using an outlet hose 22.

Figure 3A:
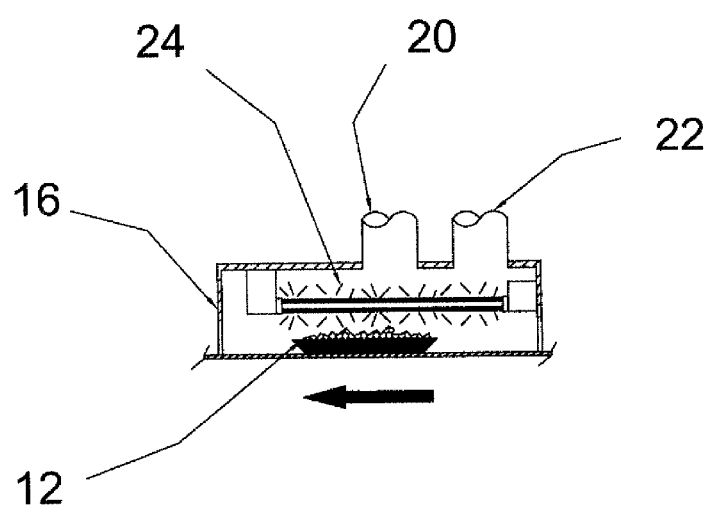
FIG. 3A is a cross-sectional view taken on line A-A in FIG. 1 and seen in an arrow direction shown in the apparatus of FIG. 1.
Figure 3B:
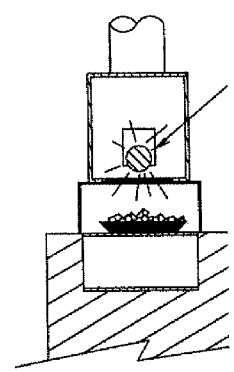
FIG. 3B is a cross sectional view taken on line B-B in FIG. 2 and seen in an arrow direction shown in the apparatus of FIG. 2.

Referring to FIGS. 3A and 3B, each mushroom package 12 is exposed to one or more pulses of light emitted from a high energy electric glow discharge lamp 24 as the mushroom package 12 is conveyed through the light chamber 16. The lamp 24 is connected to power source (not shown) and held within the light chamber 16 so as to direct light pulses onto mushrooms held within mushroom packages as they are conveyed through the light chamber 16.

Figure 4:
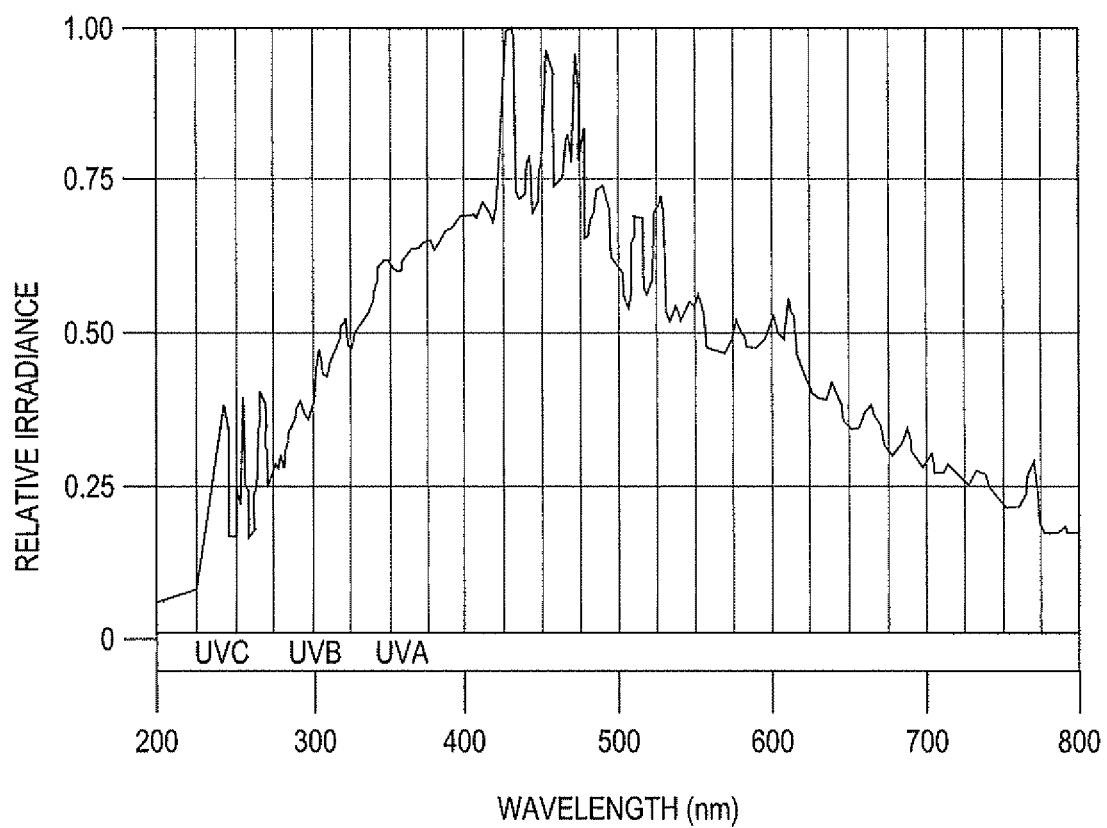
FIG. 4 is a representative plot of relative irradiance versus wavelength of light that is generated by a xenon pulsed UV light emitting electric glow discharge lamp.

A more intense UV light-emitting source was found to increase processing speed. Intense bursts of light can be emitted from pulsed lamps made with xenon gas. These pulses of light from xenon lamps occur in less than 2 milliseconds and create a broad spectrum of UV light. One type of xenon pulse lamp that has been used is Model RC-747-16 manufactured by Xenon Corporation. This xenon pulse lamp, delivers at least 505 joules total light energy per pulse. FIG. 4 illustrates the spectrum for the Model RC-747-16 xenon pulse lamp.

Optimally, the mushroom packages 12 are conveyed through the light chamber 16 so as to be exposed to from at least one to up to about 50 light pulses with wavelengths in the range of about 200 to about 1000 nanometers, preferably about 200 to about 800 nanometers, emitted by an electric glow discharge lamp. Exposure can be for up to one second, up to two seconds or up to six seconds. After such irradiation the Vitamin D2 content in the mushrooms is at least 400 IU/84 g of mushrooms. One optimum method for increasing Vitamin D2 uptake to 100% Daily Value Vitamin D in edible mushrooms is to irradiate such mushrooms with one 2-millisecond pulse at 505 joules or more.

The FDA has ruled on the safety of food exposed to xenon lamp pulsed light exposure.

Food and Drug Administration Issues Approval for Pulsed UV Light in the Production, Processing and Handling of Food Code 21CFR179.41, issued by the Food and Drug Administration (FDA), Department of Health and Human Services, approves the use of Pulsed UV light in the production, processing and handling of food.

Title 21—FOOD AND DRUGS (Page 438)

Chapter I—FOOD AND DRUG ADMINISTRATION, DEPARTMENT OF HEALTH AND HUMAN SERVICES

Part 179—IRRADIATION IN THE PRODUCTION, PROCESSING AND HANDLING OF FOOD

Subpart B—Radiation and Radiation Sources

Sec. 179.41 Pulsed light for the treatment of food

Pulsed light may be safely used for the treatment of foods under the following conditions:
(a) The radiation sources consist of xenon flashlamps designed to emit broadband radiation consisting of wavelengths covering the range of 200 to 1,000 nanometers (nm), and operated so that the pulse duration is no longer than 2 milliseconds (ms);
(b) The treatment is used for surface microorganism control;
(c) Foods treated with pulsed light shall receive the minimum treatment reasonably required to accomplish the intended technical effect; and
(d) The total cumulative treatment shall not exceed 12.0 joules/square centimeter (J/cm\2\.)

The FDA guideline uses pulsed light for surface microorganism control. Mushrooms that are exposed to xenon lamp radiation for 2 milliseconds are within the FDA guideline for food safety. Surprisingly, this short duration exposure can be sufficient to achieve significant enhancement of Vitamin D in mushrooms.

EXAMPLES

For Example 1 (Comparison), the apparatus of FIGS. 1-3B was used with the light chamber including a series of Light Emitting Diodes (LEDs) that emitted UV light at two wavelengths: 395 nanometers and 365 nanometers. The conditions for testing are as set out in Table 1. The distance between the LEDs and the mushrooms was about 30 mm. Portobello mushrooms were used for this test.

TABLE 1

| LED | 30 mm distance Exposure Time seconds | Results IU/100 g Vitamin D Total | Serving IU/84 g | Daily Value % Vitamin. D |
|---|---|---|---|---|
| 1 Control | 0 | 47.4 | 40 | 10% |
| 2 UV-A, 395 nm | 10 | 42.7 | 36 | 9% |
| 3 UV-A, 395 nm | 30 | 48.4 | 41 | 10% |
| 4 UV-B, 365 nm | 8 | 246.0 | 207 | 52% |
| 5 UV-B, 365 nm | 25 | 170.0 | 143 | 36% |

The 395 nm LED had minimal effect on the mushrooms. In contrast, the 365 nm LED resulted in 207 IU/84 g and 143 IU/84 g. These results demonstrated that a light source with greater intensity was required if exposure to light pulses is used to increase the Vitamin D content to 400 IU/84 g of mushrooms, using commercial packaging equipment.

For Example 2 (Invention), pulsed UV light from a xenon pulse lamp was provided to increase the Vitamin D2 content in mushrooms, under the conditions set out in Table 2. A Model RC-747-16 xenon pulsed lamp light was used. The lamp delivered three (3) light pulses per second. The mushrooms were moved through the light chamber on a conveyor. Mushrooms were exposed for two (2) seconds and six (6) seconds to the pulsed xenon lamp at a distance of about 30 mm from the lamp. Portobello mushroom caps were used for this test. In comparison to Example 1, the Vitamin D levels in the mushrooms increased from 250% to 1195% of the Daily Value.

TABLE 2

| | Cap Orientation | 30 mm distance Exposure Time seconds | Results IU/ 100 g Vitamin D Total | One Serving IU/84 g | 400 IU = 100% DV Daily Value % |
|---|---|---|---|---|---|
| 1-LH-2 | Gills Up | 2 | 2,680 | 2,251 | 563% |
| 2-LH-6 | Gills Up | 6 | 5,690 | 4,780 | 1195% |
| 3-LH-2-D | Gills Down | 2 | 1,190 | 1,000 | 250% |

For Example 3, the same Xenon Corporation pulsed lamp Model RC-747-16 was used, under the conditions set out in Table 3. The mushroom packages were conveyed through the light chamber at the same conveyor speed as used in Examples 1 and 2.

TABLE 3

| Xenon Test #2 | Cap Orientation | 30 mm distance Exposure time seconds | Results IU/100 g Vitamin D Total | One Serving IU/84 g | 400 IU = 100% DV Daily Value % |
|---|---|---|---|---|---|
| 1-S1-2 | Gills Down, Sliced | 1 | 1,600 | 1,344 | 336% |
| 3-C1-2 | Gills Down, Cap | 1 | 1,420 | 1,193 | 298% |

Example 3 demonstrates that a one (1) second exposure created approximately a 300% Daily Value of Vitamin D in the mushrooms. These results show that more Vitamin D is converted during the first light pulse than subsequent light pulses. Hence, exposure to one light pulse of sufficient energy can be sufficient to increase Vitamin D uptake in mushrooms.

The invention has been illustrated by detailed description and examples of particular embodiments. Various changes in form and detail may be made to the illustrative embodiments without departing from the spirit and scope of the present invention. Therefore, the invention must be measured by the claims and not by the description of the examples or the particular embodiments.

The invention claimed is:

1. A method for increasing vitamin D content of a mushroom, comprising:
   conveying a package of harvested mushrooms including the mushroom through a light chamber at a rate of about one-half package to about three packages per second; and irradiating the mushroom for a total irradiation exposure time duration of from about 2 milliseconds and up to about one second as the mushroom is conveyed through the light chamber, with one or more pulses of ultraviolet light with wavelengths in the range of about 200 to about 1000 nanometers emitted by an electric glow discharge lamp, wherein the mushroom has at least about 400 IU/84 g of mushrooms of vitamin D content after irradiation.

2. The method of claim 1, wherein the mushroom is irradiated with one pulse of light.

3. The method of claim 2, wherein irradiating is with one pulse with a duration of up to 2 milliseconds.

4. The method of claim 1, wherein the electric glow discharge lamp is a xenon lamp.

5. The method of claim 1, wherein the ultraviolet light has wavelengths in the range of about 200 to about 800 nanometers.

6. The method of claim 1, wherein the mushroom is selected from the group consisting of: white button mushrooms, brown portobello mushrooms, shiitake mushrooms and oyster mushrooms.

7. The method of claim 1, further comprising controlling temperature within the light chamber.

8. The method of claim 1, further comprising forcing air into the light chamber.

9. The method of claim 8, further comprising removing air from the light chamber.

10. A method for increasing vitamin D content of a fresh mushroom, comprising:

conveying a package of harvested fresh mushrooms including the mushroom through a light chamber at a rate of about one-half package to about three packages per second;

forcing air into the light chamber;

removing air from the light chamber; and irradiating the mushroom in the light chamber for a total irradiation exposure time duration of not more than two seconds as the mushroom is conveyed through the light chamber, with one or more pulses of ultraviolet light with wavelengths in the range of about 200 to about 1000 nanometers emitted by an electric glow discharge lamp, wherein the mushroom has at least about 400 IU/84 g of mushrooms of vitamin D content after irradiation.

* * * * *

UNITED STATES PATENT AND TRADEMARK OFFICE
CERTIFICATE OF CORRECTION

Page 1 of 1

PATENT NO. : 8,545,915 B2
APPLICATION NO. : 12/425428
DATED : October 1, 2013
INVENTOR(S) : Gary M. Schroeder It is certified that error appears in the above-identified patent and that said Letters Patent is hereby corrected as shown below:

The following should be inserted on the title page:

--Related U.S. Application Data

(60) Provisional application No. 61/049,792, filed on May 2, 2008.--

Signed and Sealed this
Nineteenth Day of November, 2013

Teresa Stanek Rea
*Deputy Director of the United States Patent and Trademark Office*